United States Patent [19]
Kawamura et al.

[11] Patent Number: 6,008,469
[45] Date of Patent: Dec. 28, 1999

[54] LASER BEAM BRANCHING APPARATUS

[75] Inventors: Atsuhiko Kawamura; Osamu Nagano, both of Nagoya, Japan

[73] Assignee: Mitsubishi Denki Kabushiki Kaisha, Tokyo, Japan

[21] Appl. No.: 08/951,557

[22] Filed: Oct. 16, 1997

[30] Foreign Application Priority Data

Mar. 27, 1997 [JP] Japan ................................. 9-075102

[51] Int. Cl.[6] ........................... B23K 26/06; G02B 27/14
[52] U.S. Cl. ............................. 219/121.77; 219/121.74; 359/636
[58] Field of Search ..................... 219/121.74, 121.77, 219/121.78; 359/618, 629, 636

[56] References Cited

U.S. PATENT DOCUMENTS

| | | | |
|---|---|---|---|
| 4,638,143 | 1/1987 | Akeel | 219/121.74 |
| 4,701,591 | 10/1987 | Masaki et al. | 219/121.77 |
| 5,408,553 | 4/1995 | English, Jr. et al. | 359/636 |
| 5,500,506 | 3/1996 | Lawson | 219/121.74 |

FOREIGN PATENT DOCUMENTS

| | | | |
|---|---|---|---|
| 798067 | 10/1997 | European Pat. Off. . | |
| 4235165 | 4/1994 | Germany . | |
| 63-171279 | 7/1988 | Japan | 219/121.74 |
| 63-192582 | 8/1988 | Japan | 219/121.74 |
| 2-70396 | 3/1990 | Japan | 219/121.74 |
| 2-142692 | 5/1990 | Japan | 219/121.74 |
| 3-285786 | 12/1991 | Japan | 219/121.74 |
| 4-138888 | 5/1992 | Japan | 219/121.74 |
| 6339786 | 12/1994 | Japan . | |
| 7294833 | 11/1995 | Japan . | |
| 8150485 | 6/1996 | Japan . | |
| 145132 | 11/1990 | Taiwan . | |

OTHER PUBLICATIONS

*Mechanical Engineering Monthly*, Mar. 1987, 2 pgs (with translation of pertinent underlined portion).

*Primary Examiner*—Geoffrey S. Evans
*Attorney, Agent, or Firm*—Sughrue, Mion, Zinn, Macpeak & Seas, PLLC

[57] ABSTRACT

A branching mirror and a transfer mirror receiving a laser beam reflected on the branching mirror and outputting a laser beam in a direction parallel to the laser beam coming into the branching mirror are fixed to and mounted on one mirror holder. The mirror holder is movably provided between a branching position at which the branching mirror is located in a light path of the laser beam and an escaping position at which the branching mirror is located outside the light path of the laser beam, and while the mirror holder is located at the beam branching position, a laser beam from a laser oscillator can be introduced to the branching mirror.

16 Claims, 10 Drawing Sheets

LASER BEAM BRANCHING APPARATUS

FIELD OF THE INVENTION

The present invention relates to a laser beam branching apparatus used for a laser processing machine or the like, and more particularly to a laser beam branching apparatus selectively branching a laser beam into two light paths.

BACKGROUND OF THE INVENTION

FIG. 10 shows a laser processing machine having a laser beam branching apparatus based on the conventional technology. This laser processing machine has two machining heads 1a and 1b, and laser beams are given to the machining heads 1a and 1b respectively from one unit of laser oscillator 2.

The laser oscillator 2 has an excitation light source 3, a solid state laser element 4 as an excitation medium, a cavity 5 incorporating therein the excitation light source 3 and the solid state laser element 4, and an optical resonator 8 comprising a total reflection mirror 6 and a partial reflection mirror (output mirror) 7 provided opposite to each other in both side of the cavity 5, and a laser beam L is outputted from the partial reflection mirror 7 to a laser optical system.

The laser optical system has a laser beam branching apparatus 9 for selectively branching the laser beam L outputted from the optical resonator 8 into two light paths, magnifying lenses 10a, 10b provided in parallel to each other at midpoints in the branched two light paths (parallel light paths) respectively, collimator lenses 11a, 11b, and converging lenses 12a, 12b, and laser beams La, Lb in the two light paths are propagated to the machining heads 1a, 1b through optical fibers 13a, 13b respectively.

Provided on each of incident end faces of the optical fibers 13a, 13b are optical fiber incident beam converging lenses 14a, 14b, and laser beams La, Lb converged by the converging lenses 12a, 12b are given to the optical fiber incident beam converging lenses 14a, 14b respectively.

It should be noted that converging lens systems each comprising a collimator lens 15a (15b) and a converging lens 16a (16b) are provided in the machining heads 1a, 1b respectively, and the laser beams La, Lb are converged to nozzle sections 17a, 17b provided at tips of the machining heads 1a, 1b, respectively.

The laser beam branching apparatus 9 has a branching mirror holder 21 holding the branching mirror (partial reflection mirror) 19 and enabling pivotal displacement of 180 degrees at a center axial line of a pivot 20 as well as a transfer mirror (total reflection mirror) 22 located and fixed in the light path of the laser beam Lb at a slope of 45 degrees.

The branching mirror 19 is positioned at either a position A (a beam branching position) located in a light path between the laser beams L and La (an optical axis of the laser beam L and that of the laser beam La are an identical axial line) at a slope of 45 degrees or a position B (an escaping position) pivotally displaced from the position A by 180 degrees and escaping outside the light paths between the laser beams L and La according to rotation by 180 degrees of a branching mirror holder 21 around a central axis of a pivot 20, and at the position A the branching mirror branches the laser beam L into the laser beams La, Lb directing to the machining heads 1a and 1b respectively, and stops branching of the laser beam at the position B so that only the laser beam La is allowed to go to the machining head 1a.

As the other type of laser beam branching apparatus, there is the one as disclosed in Japanese Patent Laid-Open Publication No. HEI 7-294833, in which total reflection mirrors each having a form like a right-angled triangle located opposite to each other in a main laser beam light path are provided movably in parallel to each other in the direction of crossing the optical axis at right angles to the main laser beam optical axis, the branching mirror branches the main laser beam into two beams by refracting the main beam to both sides of the mirror by 90 degrees in opposite directions when an apex (ridgeline) of the total reflection mirror having a form like a right-angled triangle is positioned on the optical axis (central position) of the main laser beam, and the main laser beam is refracted only to one side by 90 degrees when the total reflection mirror having a form like a right-angled triangle is located where the main laser beam is introduced into only one of slants of the mirror and the laser beam is not branched.

As shown in FIG. 10, in an apparatus in which a light path is switched (branched) to the other by pivotally displacing the branching mirror holder 21 holding only one piece of the branching mirror 19, when there occurs angle displacement in the branching mirror holder 21 at the position A, an incident angle of the laser beam into the transfer mirror 22 is changed and a position of the incident light into an optical system to be converged to the optical fiber 13b is also displaced, and for this reason converging performance of the laser beam Lb outputted from the optical fiber 13b is reduced, and at the worst the laser beam Lb is not introduced into the optical fiber 13b, which sometimes causes the optical fiber 13b to be burnt and resultantly processing to be impossible.

For this reason, in order to prevent generation of angle displacement in the branching mirror holder 21, a driving system of the branching mirror holder 21 for realizing selection of a light path is required to have high-angular positioning accuracy, which causes the structure to be complicated and so much cost to be required.

In the laser beam branching apparatus as shown in Japanese Patent Laid-Open Publication No. HEI 7-294833, the above problem does not occur, but the laser beam is branched at the optical axis (beam center) of the main laser beam as an interface therebetween, so that a position of maximum light intensity of the branched laser beam is not located at the center of the beam, and the light intensity is distributed on one side, and for this reason a high-quality branched laser beam can not be obtained.

SUMMARY OF THE INVENTION

It is an object of the present invention to obtain a laser beam branching apparatus which can branch a laser beam with high precision without requiring high positioning accuracy and also can obtain a high-quality branched laser beam with the maximum light intensity thereof positioned at the center of the beam.

To achieve the above object, in a laser beam branching apparatus according to the present invention, a branching mirror and a transfer mirror are mounted onto and fixed on one mirror holder, so that a relative position between the branching mirror and the transfer mirror is not changed even if the mirror holder is moved to either one of the positions, the beam branching position and the escaping position, and the transfer mirror outputs a laser beam in a direction parallel to a laser beam introduced into the branching mirror even the beam branching position is displaced.

In a laser beam branching apparatus according to another feature of the present invention, the mirror holder is pivoted by a rotary driving unit between the beam branching position and the escaping position, and even if the beam branching position is displaced in a pivotal angular direction, incident angles of the laser beam introduced into the branching mirror as well as into the transfer mirror are changed at the same degree, so that the laser beam outputted from the transfer mirror is displaced only in a parallel position thereto and can maintain parallelism to the laser beam introduced into the branching mirror.

In a laser beam branching apparatus according to another feature of the present invention, the mirror holder is linearly driven by a liner driving unit between the beam branching position and the escaping position, and even if the beam branching position is displaced in a linearly movable direction, only incident positions of the laser beam introduced into the branching mirror as well as into the transfer mirror are changed, so that the laser beam outputted from the transfer mirror can maintain parallelism to the laser beam introduced into the branching mirror and any positional displacement does not occur therebetween.

In a laser beam branching apparatus according to another feature of the present invention, a laser beam introduced into the branching mirror is totally reflected thereon, so that time branching can be realized.

In a laser beam branching apparatus according to another feature of the present invention, a laser beam introduced into the branching mirror is partially reflected thereon, so that synchronous branching can be realized.

In a laser beam branching apparatus according to another feature of the present invention, one of the pairs in which the branching mirror comprises a total reflection mirror and the other pair in which the branching mirror comprises a partial reflection mirror are selectively (alternatively) used, so that time branching and synchronous branching can alternatively be executed.

In a laser beam branching apparatus according to another feature of the present invention, the laser beam branching apparatus is provided as a unit separated and independent from a laser oscillator.

Other objects and features of this invention will become understood from the following description with reference to the accompanying drawings.

DESCRIPTION OF THE PREFERRED EMBODIMENTS

Figure 1:
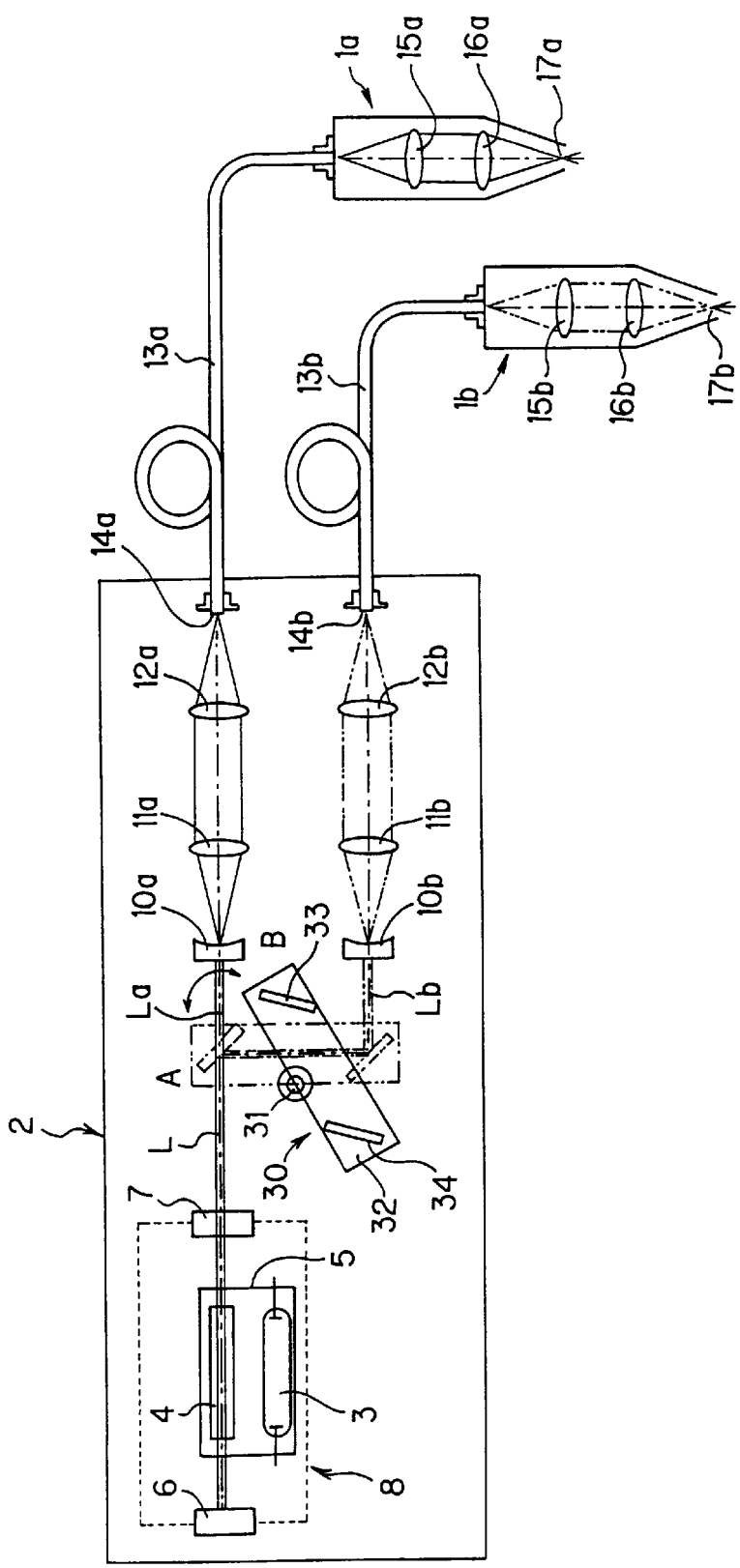
FIG. 1 is a schematic view showing configuration of a laser processing machine incorporating therein the laser beam branching apparatus according to Embodiment 1 of the present invention.

Detailed description is made hereinafter for embodiments of the laser beam branching apparatus according to the present invention with reference to the related drawings. It should be noted that, in the embodiments described below, the same reference numerals are assigned to the same sections corresponding to those based on the conventional technology, and description thereof is omitted herein.

Figure 2:
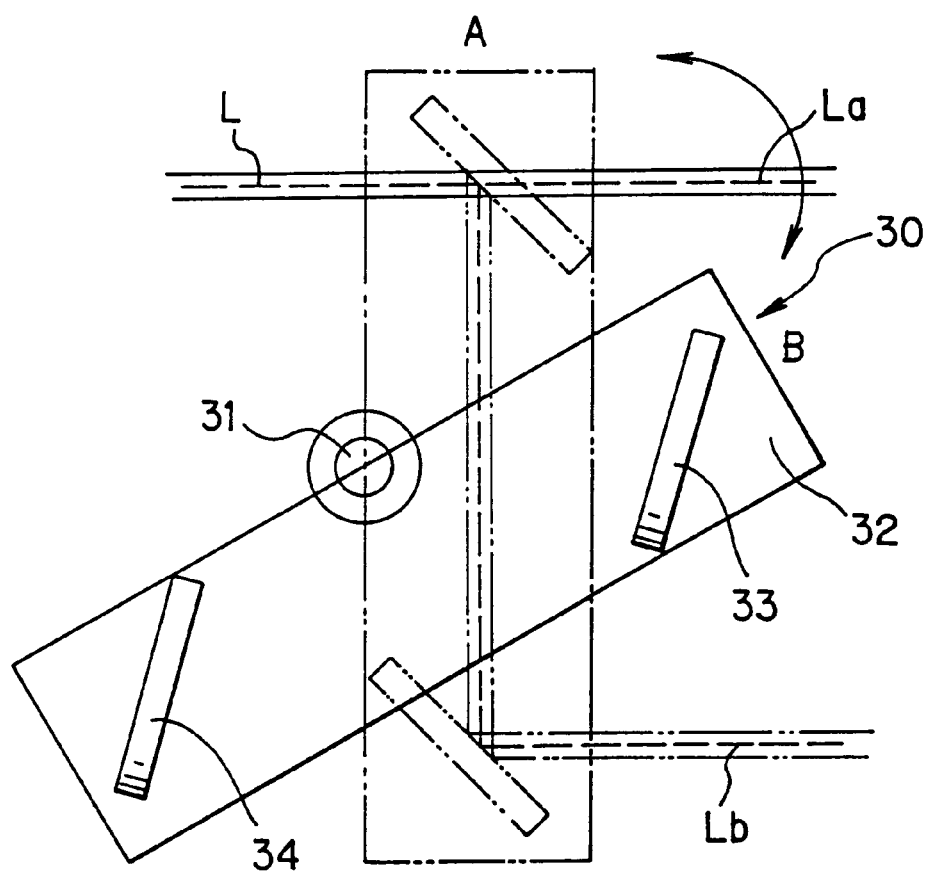
FIG. 2 is a view showing configuration of a laser beam branching apparatus according to Embodiment 1 of the present invention.
Figure 3:
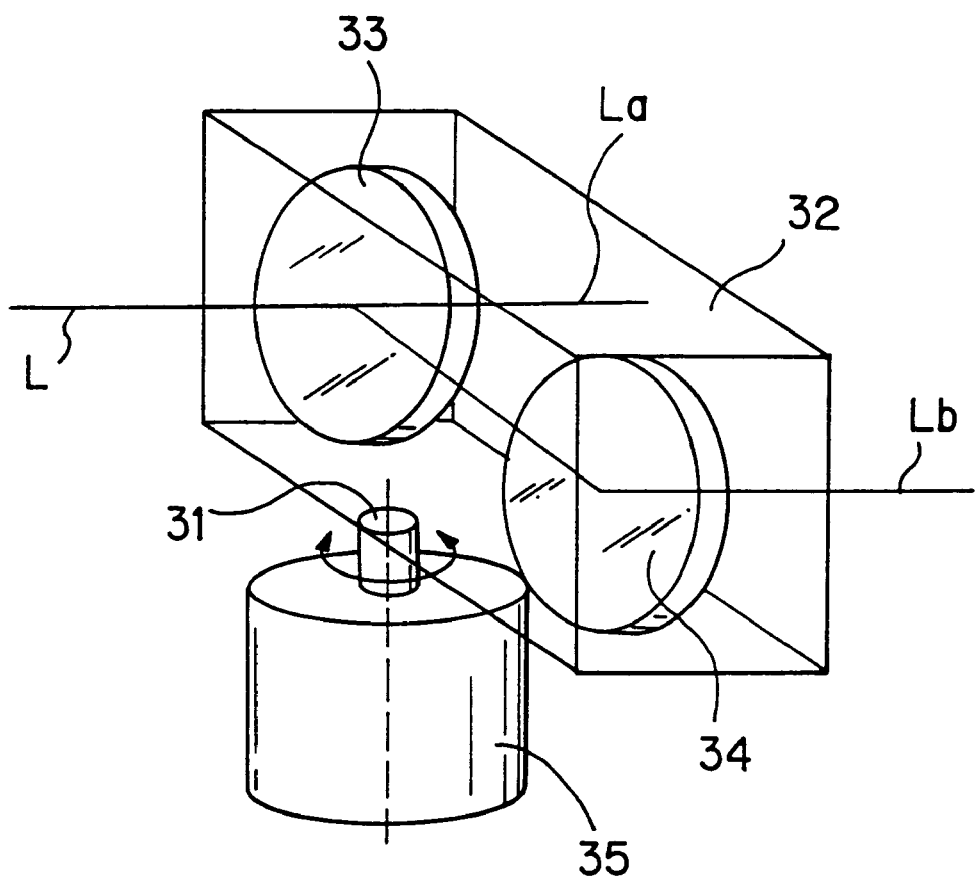
FIG. 3 is a perspective view showing the laser beam branching apparatus according to Embodiment 1 of the present invention.

FIG. 1 to FIG. 3 show Embodiment 1 of the laser beam branching apparatus according to the present invention. The laser beam branching apparatus 30 has a mirror holder 32 which can pivotally displace between a position A and a position B at a pivot 31 as a pivotal center. The mirror holder 32 holds and fixes thereto both a branching mirror 33 comprising a partial reflection mirror and a transfer mirror 34 comprising a total reflection mirror.

The branching mirror 33 and the transfer mirror 34 are mounted onto and fixed on the mirror holder 32 respectively so that reflection surface thereof are opposite to each other accurately at an angle of 45 degrees. Positioning accuracy in mounting of those two mirrors on the holder is substantially invariant according to the default value, and for this reason it is possible to comparatively easily obtain a desired positioning accuracy in the mounting thereof according to the ordinary structure for fixing a mirror.

The mirror holder 32 locates the branching mirror 33 in a light path of a laser beam (main laser beam) L at an angle of a slope of 45 degrees at a position A (beam branching position) and locates the branching mirror 33 at an escaping position apart from the light path of the laser beam L at a position B (escaping position).

The pivot 31 of the mirror holder 32 is pivotally coupled to a rotary driving unit 35 comprising a rotary solenoid and a pulse motor (Refer to FIG. 3). The rotary driving unit 35 pivots the mirror holder 32 between the position A and the position B according to energization control or pulse control.

Description is made for operations of the laser beam branching apparatus 30 according to the configuration as described above.

When the laser beam L is supplied to the machining head 1a as one of the heads, namely when the beam is not branched, the rotary driving unit 35 moves the mirror holder 32 to the position B so that the branching mirror 33 is located outside the light path of the laser beam L. At this point of time, a light path system which is straight and simple with no reflection is set, and the laser beam L is introduced only into the optical fiber 13a as one of the fibers as the beam L which is identical to the beam La.

When the laser beam L is supplied to both the machining heads 1a and 1b, namely when the beam is branched (synchronous branching), the rotary driving unit 35 moves the mirror holder 32 to the position A so that the branching mirror 33 is located in the light path of the laser beam L. In this case, a potion of the laser beam L passes through the branching mirror 33 and is introduced into one of the optical fibers 13a in a straight light path as a laser beam La, while the remaining laser beam L reflects on the branching mirror 33 to direct to the transfer mirror 34 as a laser beam Lb, and further reflects on the transfer mirror 34 and goes on along a light path parallel to the laser beam La to be introduced into the optical fiber 13b.

Figure 4:
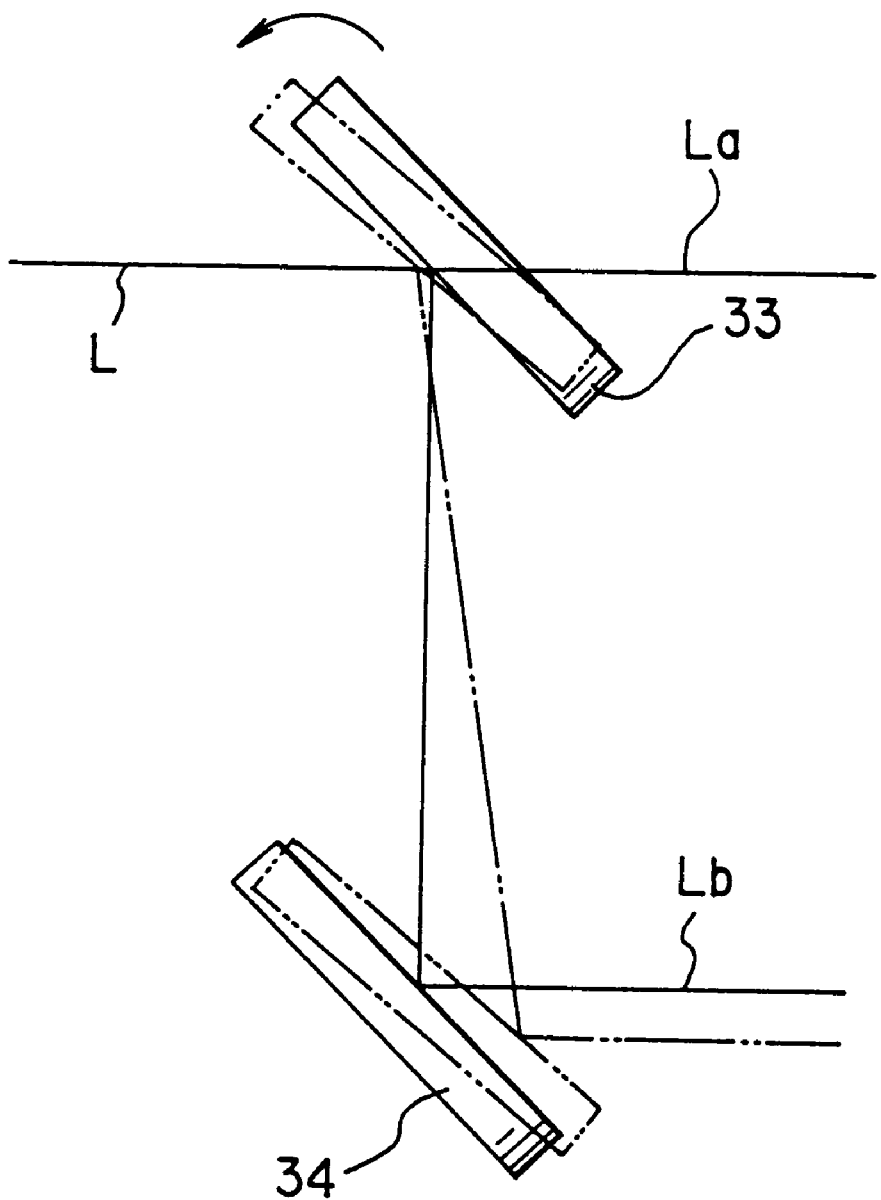
FIG. 4 is an explanatory view showing a state of positional displacement in Embodiment 1.

The branching mirror 33 and the transfer mirror 34 are integrally fixed on the same mirror holder 32, so that there is no relative positional displacement between those two mirrors, and even if the position A of the mirror holder 32 is displaced, as indicated by the virtual line in FIG. 4, from the regular position thereof indicated by the solid line, an incident angle of the laser beam into the branching mirror 33 and that into the transfer mirror 34 are equally changed in the directions of the branching mirror 33 as well as of the transfer mirror 34, and for this reason the laser beam Lb reflected on the transfer mirror 34 generates only parallel positional displacement and can be insured to proceed along a light path parallel to the laser beam L introduced into the branching mirror 33 as well as to the laser beam La.

With this feature, even if there occurs positional displacement of the mirror holder 32 in the pivotal direction at the position A, the laser beam Lb results in only a positional displacement in parallel to the laser beam L and can still maintain parallelism therebetween, so that adjustment of the optical system can easily be executed simply by correcting only the parallel shift. In addition, if a rate of the parallel displacement is in an allowable range of the optical system of the laser beam Lb, the displacement hardly occurs because an incident optical fiber converging lens 14b of the optical fiber 13a is a focus position of the laser beam Lb focused by a converging lens 12b.

It should be noted that the branching mirror 33 may comprise a total reflection mirror, and in this case, a laser beam is given only to the machining head 1a if the mirror holder 32 is located at the position A, and a laser beam is given only to the machining head 1b if the mirror holder 32 is located at the position B, so that time branching is executed.

With this operation, it is possible to obtain a high-quality branched laser beam in which the laser beam is branched with high precision without requiring high positioning accuracy and in addition the maximum light intensity is positioned at the center of the beam.

Figure 5:
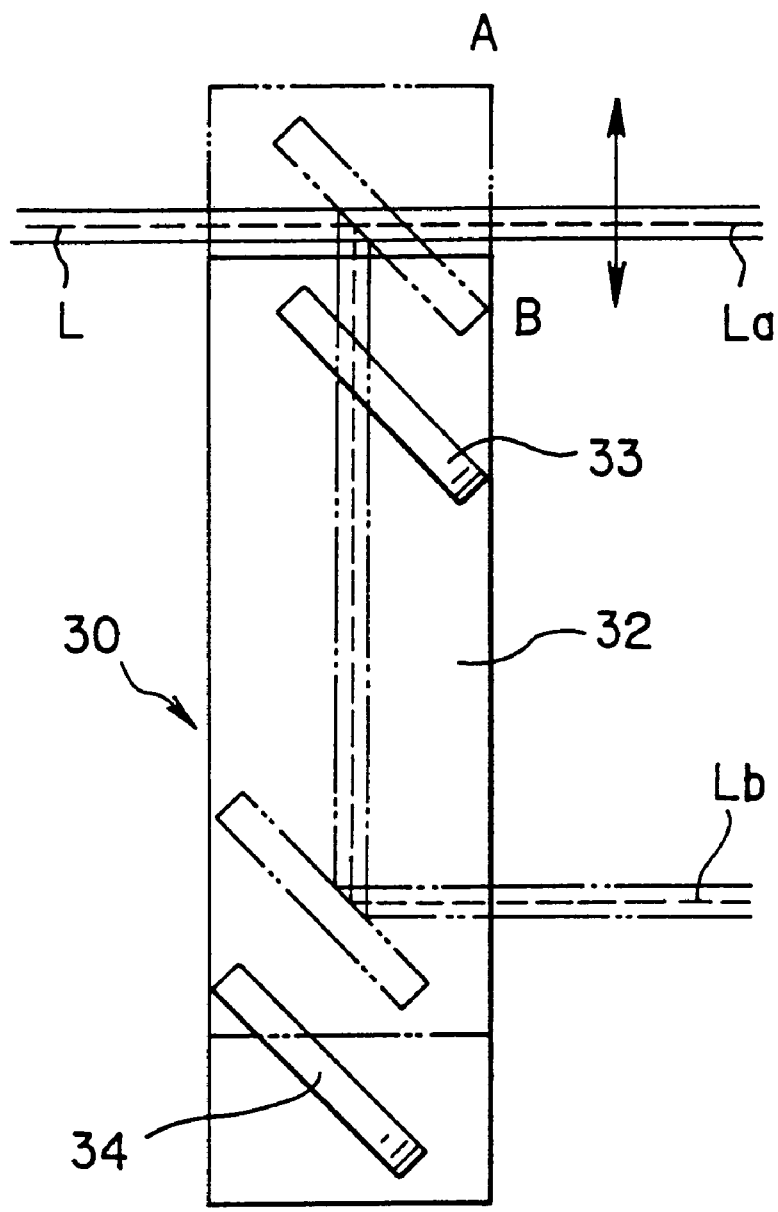
FIG. 5 is a view showing configuration of a laser beam branching apparatus according to Embodiment 2 of the present invention.
Figure 6:
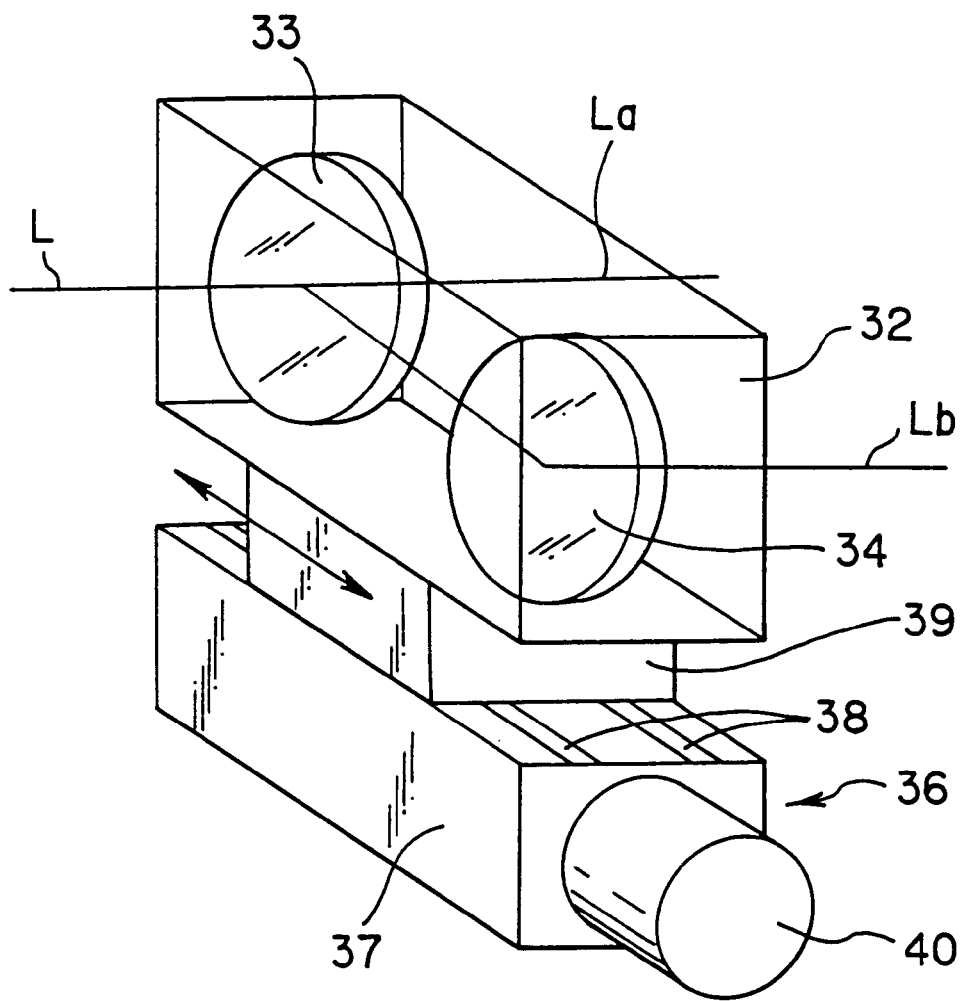
FIG. 6 is a perspective view showing the laser beam branching apparatus according to Embodiment 2 of the present invention.

FIG. 5 and FIG. 6 show Embodiment 2 of the laser beam branching apparatus according to the present invention. It should be noted that, in FIG. 5 and FIG. 6, the same reference numerals are assigned to the sections corresponding to those in FIG. 1 to FIG. 4.

In the embodiment, the mirror holder 32 is mounted on a slider 39 linearly moving by being guided along linear guides 38 provided in a base member 37 of a linear driving unit 36 and linearly moves between the position A and the position B.

The mirror holder 32 places, as is in a case in Embodiment 1, the branching mirror 33 in a light path of the laser beam (main laser beam) L at an angle of a slope of 45 degrees at the position A, and places the branching mirror 33 at an escaping position apart from the light path of the laser beam L at the position B.

The linear driving unit 36 is based on an air system or on an electric motor system, and linearly drives the mirror holder 32 between the position A and the position B according to control of air supply to an actuator 40 as well as to energization control thereto.

It should be noted that, in this embodiment, the mirror holder 32 holds and fixes thereto, as is in a case in Embodiment 1, both the branching mirror 33 and the transfer mirror 34.

In Embodiment 2, when the laser beam L is supplied to the machining head 1a as one of the heads, the linear driving unit 36 moves the mirror holder 32 to the position B so that the branching mirror 33 is located outside the light path of the laser beam L. At this point of time, a light path system which is straight and simple with no reflection is set, and the laser beam L is introduced only into the optical fiber 13a as one of the fibers as the beam L which is identical to the beam La.

When the laser beam L is supplied to both the machining heads 1a and 1b, the linear driving unit 36 moves the mirror holder 32 to the position A so that the branching mirror 33 is located in the light path of the laser beam L. In this case, a portion of the laser beam L passes through the branching mirror 33 and is introduced into one of the optical fibers 13a in a straight light path as a laser beam La, while the remaining laser beam L reflects on the branching mirror 33 to direct to the transfer mirror 34 as a laser beam Lb, and further reflects on the transfer mirror 34 and goes on along a light path parallel to the laser beam La to be introduced into the optical fiber 13b.

Figure 7:
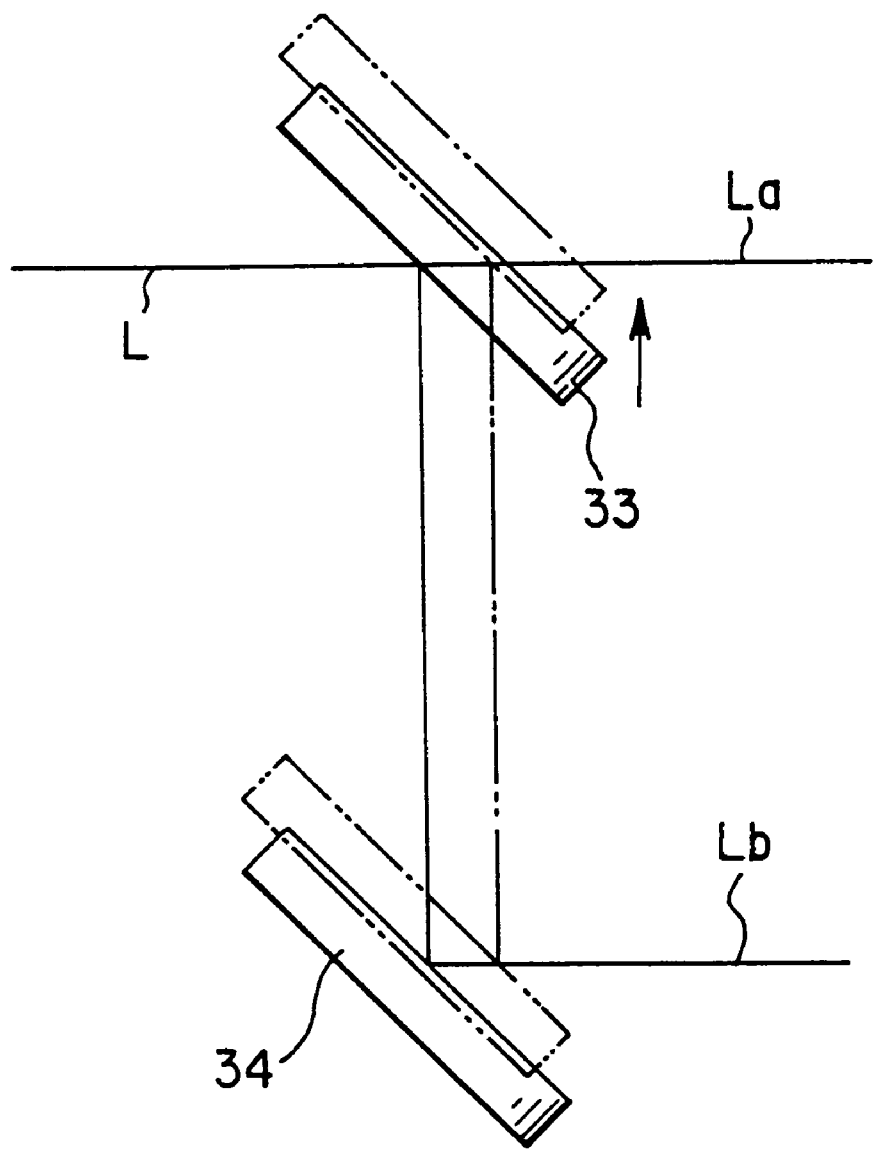
FIG. 7 is an explanatory view showing a state of positional displacement in Embodiment 2.

In the embodiment, the branching mirror 33 and the transfer mirror 34 are also integrally fixed on the same mirror holder 32, so that there is no relative positional displacement between those two mirrors, and even if the position A of the mirror holder 32 is displaced, as indicated by the virtual line in FIG. 7, from the regular position thereof indicated by the solid line, only an incident position of the laser beam into the branching mirror 33 and that into the transfer mirror 34 are changed, and for this reason the laser beam Lb can be insured to proceed along a light path parallel to the laser beam L introduced into the branching mirror 33 as well as to the laser beam La without generating any positional displacement.

With this feature, even if there occurs positional displacement of the mirror holder 32 in the linearly movable direction at the position A, the laser beam Lb can maintain parallelism therebetween without generating parallel positional displacement, and for this reason it is possible to obtain a high-quality branched laser beam in which the laser beam is branched with high precision without requiring high positioning accuracy and in addition the maximum light intensity is positioned at the center of the beam.

It should be noted that, in the embodiment, the branching mirror 33 may also comprise a total reflection mirror, and in this case, a laser beam is given only to the machining head 1a if the mirror holder 32 is located at the position A, and a laser beam is given only to the machining head 1b if the mirror holder 32 is located at the position B, so that time branching is executed.

Figure 8:
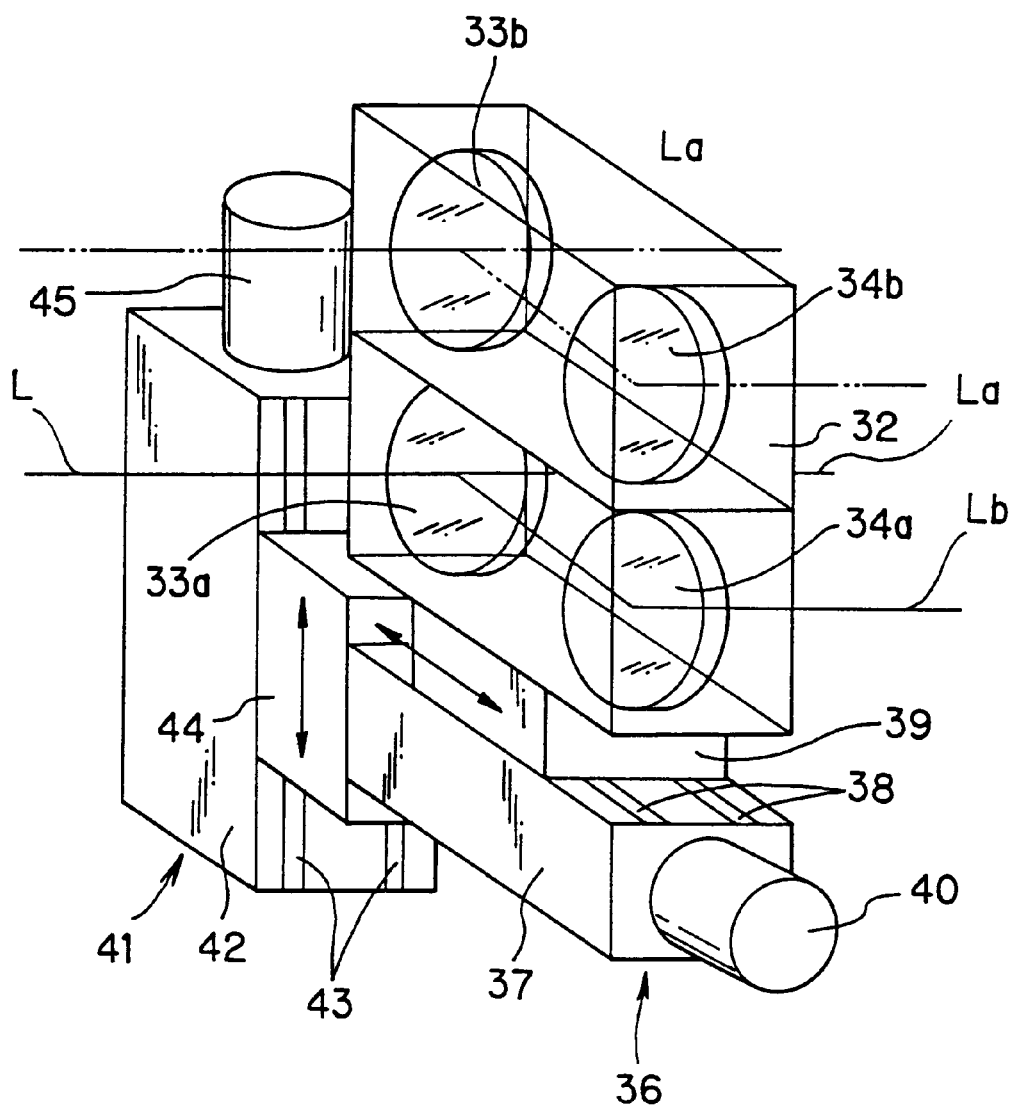
FIG. 8 is a perspective view showing a laser beam branching apparatus according to Embodiment 3 of the present invention.

FIG. 8 shows Embodiment 3 of the laser beam branching apparatus according to the present invention. It should be noted that, in FIG. 8, the same reference numerals are assigned to the sections corresponding to those in FIG. 5 and FIG. 6.

In the embodiment, two pairs of mirrors are provided each pair consisting of a branching mirror (33a, 33b) and a transfer mirror (34a, 34b) in the mirror holder 32. Both the transfer mirrors 34a, 34b comprise total reflection mirrors respectively, while the branching mirror 33a comprises a total reflection mirror and the branching mirror 33b comprises a partial reflection mirror.

The base member 37 of the linear driving unit 36 driving the mirror holder 32 in the horizontal direction between the position A and the position B is mounted on a slider 44 of a linear driving unit 41 moving in the vertical direction.

The linear driving unit 41 is based on an air system or an electric motor system, has the slider 44 linearly moving by being guided along linear guides 43 provided on a base member 42, and linearly drives the mirror holder 32 between an upward position and a downward position according to control of air supply to an actuator 45 as well as to current-carrying control thereto.

In the embodiment, the mirror holder 32 is located at either of the upward position or the downward position by the linear driving unit 41, whereby either one of the pair consisting of the branching mirror 33a and transfer mirror 34a or the other pair consisting of the branching mirror 33b and transfer mirror 34b can selectively be positioned at an operating position which may be the position A or the position B, and is ready to act.

For example, when the mirror holder 32 is positioned at the upward position, the branching mirror 33a and the transfer mirror 34a are ready to act, so that time branching in which only a laser beam Lb can be obtained at the upward position/the position A while only a laser beam La can be obtained at the upward position/the position B can be realized.

In contrast, when the mirror holder 32 is positioned at the downward position, the branching mirror 33b and the transfer mirror 34b are ready to act, so that synchronous branching in which laser beams La and Lb can be obtained at the downward position/the position A while only a laser beam La can be obtained at the downward position/the position B can be realized.

It should be noted that, in the embodiment, the branching mirrors 33a, 33b and the transfer mirrors 34a, 34b are also integrally fixed on the same mirror holder 32, so that there is no relative positional displacement between each pair of mirrors respectively, and even if the position A of the mirror holder 32 is displaced from the regular position thereof, only incident positions of the laser beam into the branching mirror 33a as well as into the transfer mirror 34a or only incident positions thereof into the branching mirror 33b as well as into the transfer mirror 34b are changed, and for this reason the laser beam Lb can be insured to proceed along a light path parallel to the laser beam L introduced into the branching mirror 33 as well as to the laser beam La without generating any positional displacement.

Figure 9:
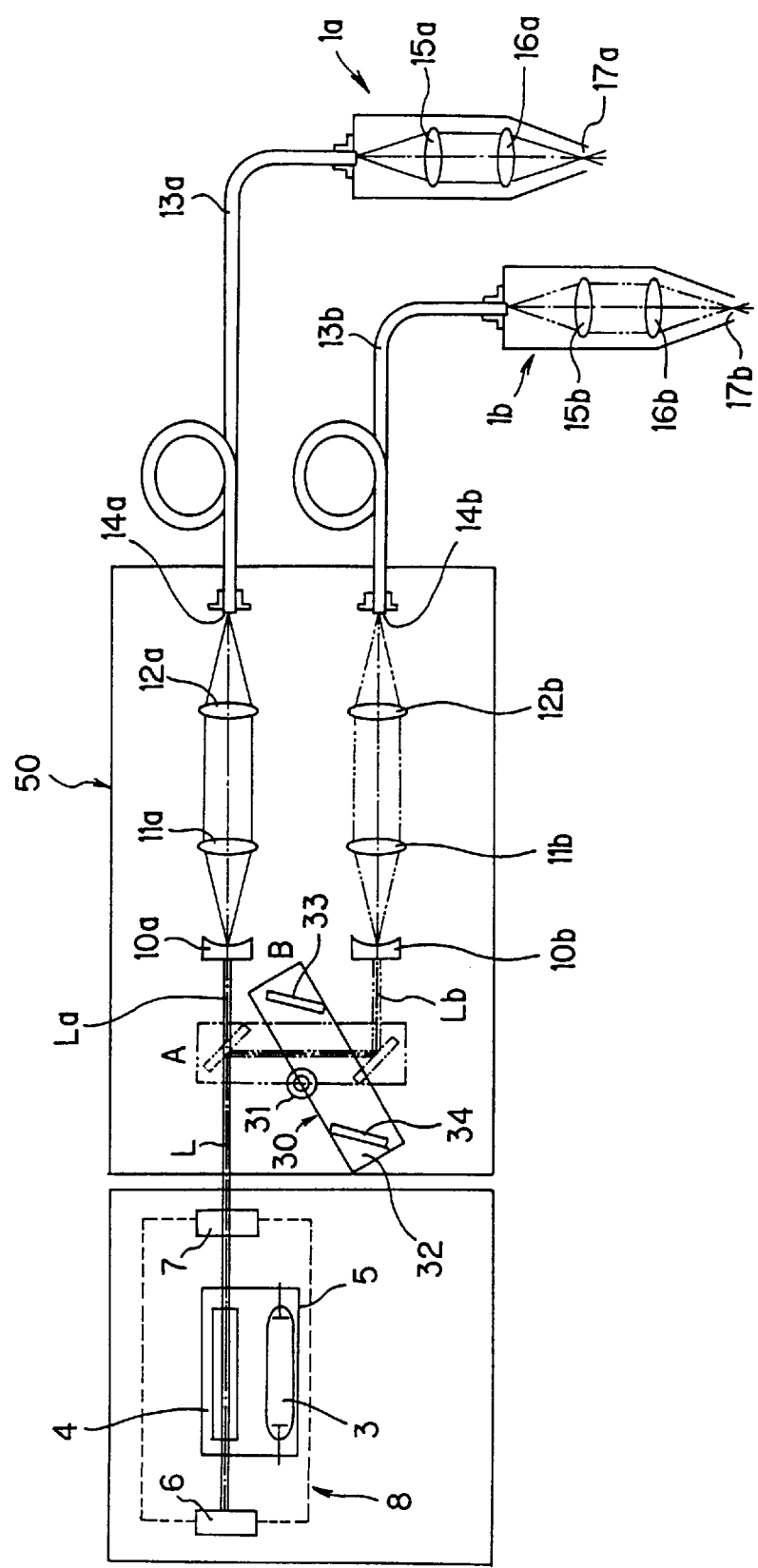
FIG. 9 is a schematic view showing configuration of a laser processing machine incorporating therein the laser beam branching apparatus according to Embodiment 4 of the present invention.
Figure 10:
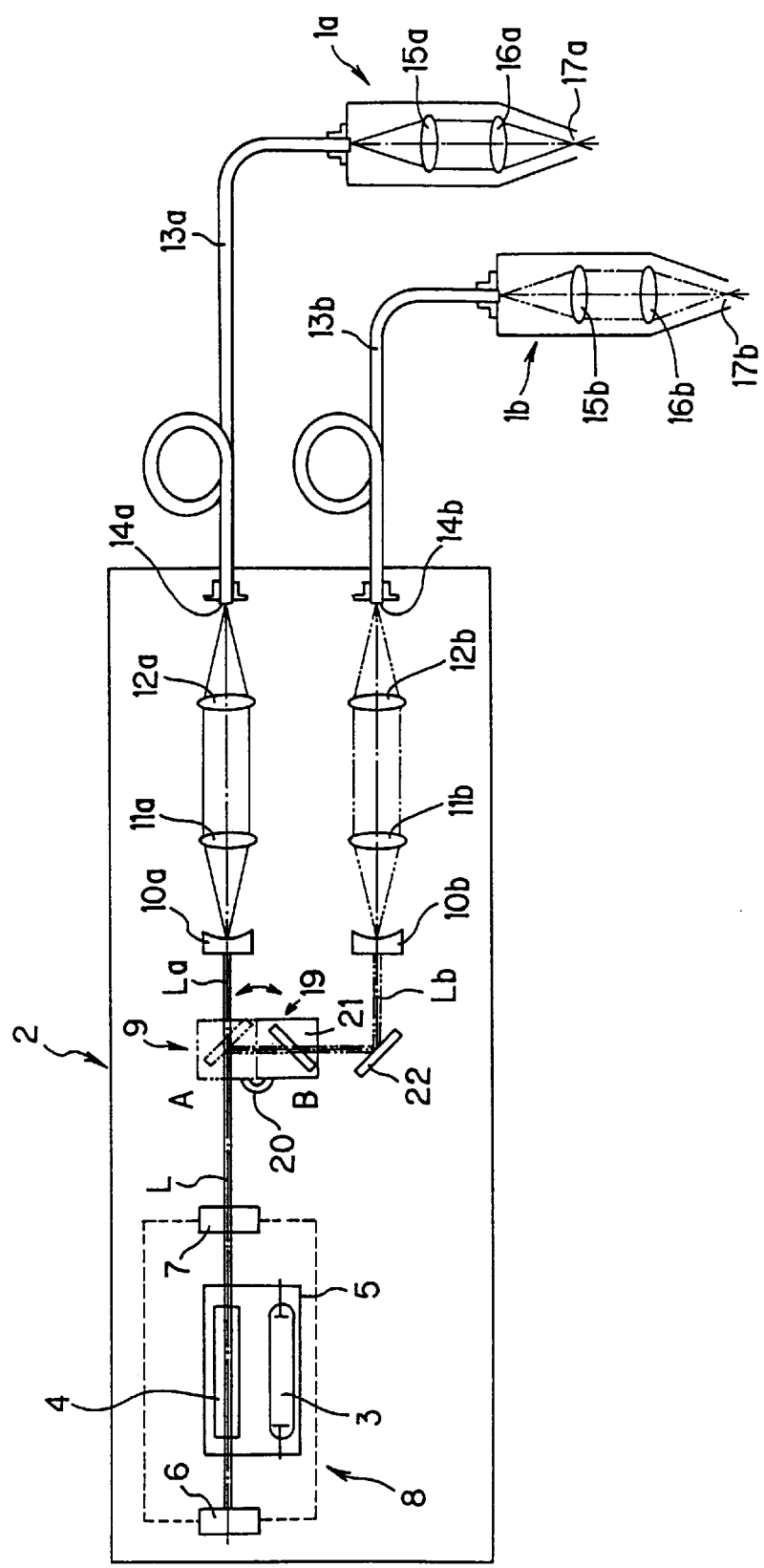
FIG. 10 is a schematic view showing configuration of a laser processing machine incorporating therein the laser beam branching apparatus based on the conventional technology.

FIG. 9 shows Embodiment 4 of the laser beam branching apparatus according to the present invention. It should be noted that, in FIG. 9, the same reference numerals are assigned to the sections corresponding to those in FIG. 1.

In the embodiment, a laser optical system comprising a laser beam branching apparatus 30, enlarged lenses 10a, 10b, collimator lenses 11a, 11b and converging lenses 12a, 12b is provided as an optical system unit 50 separated and independent from a laser oscillator (optical resonator 8).

In this case, flexibility of combining the laser oscillator with the laser optical system including the laser beam branching apparatus 30 increases, configuration of the laser oscillator can be simpler, and by reducing the volume thereof, the outer dimensions can be minimized.

As understood from the description described above, with the laser beam branching apparatus according to the present invention, the branching mirror and the transfer mirror are mounted onto and fixed on one mirror holder, so that a relative position between the branching mirror and the transfer mirror is not changed even if the mirror holder is moved to either one of the positions, the beam branching position and the escaping position, and the transfer mirror outputs a laser beam in a direction parallel to a laser beam introduced into the branching mirror even the beam branching position is displaced, and for this reason it is possible to obtain a high-quality branched laser beam in which the laser beam is branched with high precision without requiring high positioning accuracy and in addition the maximum light intensity is positioned at the center of the beam.

With the laser beam branching apparatus according to another feature of the present invention, the mirror holder is pivoted by the rotary driving unit between the beam branching position and the escaping position, and even if the beam branching position is displaced in a pivotal angular direction, incident angles of the laser beam introduced into the branching mirror as well as into the transfer mirror are changed at the same degree, so that the laser beam outputted from the transfer mirror is only displaced in parallel position thereto and can maintain parallelism to the laser beam introduced into the branching mirror, and for this reason, with such a simple configuration as a pivotal mechanism, it is possible to obtain a high-quality branched laser beam in which the laser beam is branched with high precision without requiring high positioning accuracy and in addition the maximum light intensity is positioned at the center of the beam.

With the laser beam branching apparatus according to another feature of the present invention, the mirror holder is linearly driven by a liner driving unit between the beam branching position and the escaping position, and even if the beam branching position is displaced in a linearly movable direction, incident positions of the laser beam introduced into the branching mirror as well as into the transfer mirror are changed, so that the laser beam outputted from the transfer mirror can maintain parallelism to the laser beam introduced into the branching mirror and any positional displacement does not occur therebetween, and for this reason it is possible to obtain a high-quality branched laser beam in which the laser beam is branched with high precision without requiring high positioning accuracy and in addition the maximum light intensity is positioned at the center of the beam.

With the laser beam branching apparatus according to another feature of the present invention, a laser beam introduced into the branching mirror is totally reflected thereon, so that high-precision time branching thereof can be realized without requiring high positioning accuracy.

With the laser beam branching apparatus according to another feature of the present invention, a laser beam introduced into the branching mirror is partially reflected thereon, so that high-precision synchronous branching thereof can be realized without requiring high positioning accuracy.

With the laser beam branching apparatus according to another feature of the present invention, one of the pairs in which the branching mirror comprises a total reflection mirror and the other pair in which the branching mirror comprises a partial reflection mirror are selectively used, so that time branching and synchronous branching thereof can alternatively be obtained without requiring high positioning accuracy.

With the laser beam branching apparatus according to another feature of the present invention, the laser beam branching apparatus is provided as a unit separated and independent from a laser oscillator, so that flexibility of combining the laser oscillator with the laser optical system including the laser beam branching apparatus increases, configuration of the laser oscillator can be simpler, and by converging the volume thereof, the outer dimensions can be minimized.

This application is based on Japanese patent application No. HEI 9-75102 filed in the Japanese Patent Office on Mar. 27, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A laser beam branching apparatus in which a branching mirror and a transfer mirror comprising a total reflection mirror for receiving the laser beam reflected on said branching mirror and outputting a laser beam in a direction parallel to that of the laser beam introduced into said branching mirror are mounted onto and fixed on one mirror holder; said mirror holder is movably provided between a beam branching position at which said branching mirror is located in a light path of a laser beam from a laser oscillator and a mirror escaping position to which said branching mirror goes out of the light path of said laser beam, and the laser beams from said laser oscillator is introduced into said branching mirror when said mirror holder is located at said beam branching position.

2. A laser beam branching apparatus according to claim 1, wherein said branching mirror comprises a total reflection mirror.

3. A laser beam branching apparatus according to claim 1; wherein said branching mirror comprises a partial reflection mirror.

4. A laser beam branching apparatus according to claim 1; wherein two pairs of mirrors are provided, each pair comprising one said branching mirror and one said transfer mirror; said branching mirror in one of the pairs comprises a total reflection mirror; a said branching mirror in the other pair comprises a partial reflection mirror; and said branching mirror and said transfer mirror in either one of the two pairs can selectively be positioned at an operating position which may be either said beam branching position or said escaping position.

5. A laser beam branching apparatus according to claim 1; wherein said mirror holder and a driving unit for the same are provided on a unit separated and independent from a laser oscillator.

6. A laser beam branching apparatus according to claim 1, wherein said mirror holder is pivotally provided at a pivot and is pivoted by a rotary driving unit between said beam branching position and said escaping position.

7. A laser beam branching apparatus according to claim 6, wherein said branching mirror comprises a total reflection mirror.

8. A laser beam branching apparatus according to claim 6; wherein said branching mirror comprises a partial reflection mirror.

9. A laser beam branching apparatus according to claim 6; wherein two pairs of mirrors are provided, each pair comprising one said branching mirror and one said transfer mirror; said branching mirror in one of the pairs comprises a total reflection mirror; said branching mirror in the other pair comprises a partial reflection mirror; and said branching mirror and said transfer mirror pair in either of the two pairs can selectively be positioned at an operating position which may be either said beam branching position or said escaping position.

10. A laser beam branching apparatus according to claim 6; wherein said mirror holder and a driving unit for the same are provided on a unit separated and independent from a laser oscillator.

11. A laser beam branching apparatus according to claim 1, wherein said mirror holder is linearly movably provided and is linearly driven by a linear driving unit between said beam branching position and said escaping position.

12. A laser beam branching apparatus according to claim 11, wherein said branching mirror comprises a total reflection mirror.

13. A laser beam branching apparatus according to claim 11; wherein said branching mirror comprises a partial reflection mirror.

14. A laser beam branching apparatus according to claim 11; wherein two pairs of mirrors are provided, each pair of comprising one said branching mirror and one said transfer mirror; said branching mirror in one of the pairs comprises a total reflection mirror; said branching mirror in the other pair comprises a partial reflection mirror; and said branching mirror and said transfer mirror pair in either of the two pairs can selectively be positioned at an operating position which may be either said beam branching position or said escaping position.

15. A laser beam branching apparatus according to claim 11; wherein said mirror holder and a driving unit for the same are provided on a unit separated and independent from a laser oscillator.

16. A laser beam branching apparatus comprising:

a branching mirror;

a transfer mirror comprising a total reflection mirror for receiving a laser beam reflected from said branching mirror and outputting said laser beam in a direction parallel to that of the laser beam introduced into said branching mirror; and a mirror holder selectively positioned in one of a beam branching position and a mirror escaping position, wherein said branching position places said branching mirror in a light path of a laser beam from a laser oscillator and said mirror escaping position places said branching mirror out of the light path of said laser beam and the branching mirror and the transfer mirror are integrally fixed to said mirror holder and simultaneously moved without relative positional displacement between the branching mirror and transfer mirrors when placed in either of the beam branching or mirror escaping positions.

* * * * *